United States Patent [19]
Ito et al.

[11] Patent Number: 5,390,044
[45] Date of Patent: Feb. 14, 1995

[54] CIRCULAR ARC ILLUMINATION APPARATUS

[75] Inventors: Tatsuo Ito, Osaka; Toshiyuki Watanabe, Neyagawa; Masaki Suzuki, Hirakata, all of Japan

[73] Assignee: Matsushita Electric Industrial Co., Ltd., Osaka, Japan

[21] Appl. No.: 70,686

[22] Filed: Jun. 2, 1993

[30] Foreign Application Priority Data

Jun. 3, 1992 [JP] Japan ................................ 4-142322

[51] Int. Cl.6 ............................................ G02B 26/08
[52] U.S. Cl. ...................................... 359/212; 359/63; 359/221; 359/226; 250/236
[58] Field of Search ................................ 359/196–199, 359/208, 212–219, 221, 36, 54, 55, 62, 63, 66, 223, 226, 205; 250/234–236, 237 R; 358/474; 346/108, 160; 362/247, 296, 347; 356/138, 140

[56] References Cited

U.S. PATENT DOCUMENTS 4,186,991 2/1980 Koide et al. ..................... 359/221
4,538,181 8/1985 Taylor ............................ 250/236

FOREIGN PATENT DOCUMENTS 54-123877 9/1979 Japan .
57-200012 12/1982 Japan .
63-102228 5/1988 Japan .

Primary Examiner—Loha Ben
Assistant Examiner—James Phan
Attorney, Agent, or Firm—Wenderoth, Lind & Ponack

[57] ABSTRACT

A circular arc illumination apparatus includes a light source device, a condensing optical system for condensing rays emitted by the light source device, and a scanning optical system for transmitting the rays to an object to be scanned. The scanning optical system includes a driving device, a rotating mirror driven by the driving device, an angular velocity detecting device for detecting an angular velocity of the rotating mirror, a controller for controlling the driving device based on an angular velocity of the rotating mirror detected by the angular velocity detecting device so as to vary the angular velocity in one time scanning, and a circular arc-shaped bending mirror for reflecting scanning rays reflected by the rotating mirror to the object. The axis of the bending mirror is coincident with a rotary axis of the rotating mirror.

8 Claims, 14 Drawing Sheets

CIRCULAR ARC ILLUMINATION APPARATUS

BACKGROUND OF THE INVENTION

The present invention relates to a circular arc illumination apparatus such as a reflection type projection aligner, and more particularly to a circular arc illumination apparatus preferable for exposing a large substrate such as a liquid crystal display device having a large screen.

Figure 7:
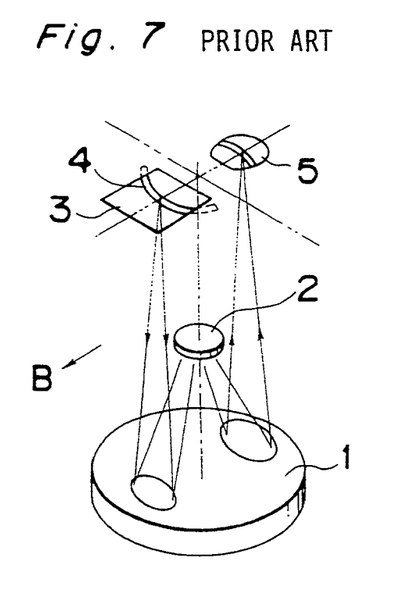
FIG. 7 is a view showing a projection optical system of a conventional 1:1 projection aligner of the reflection type.
Figure 8:
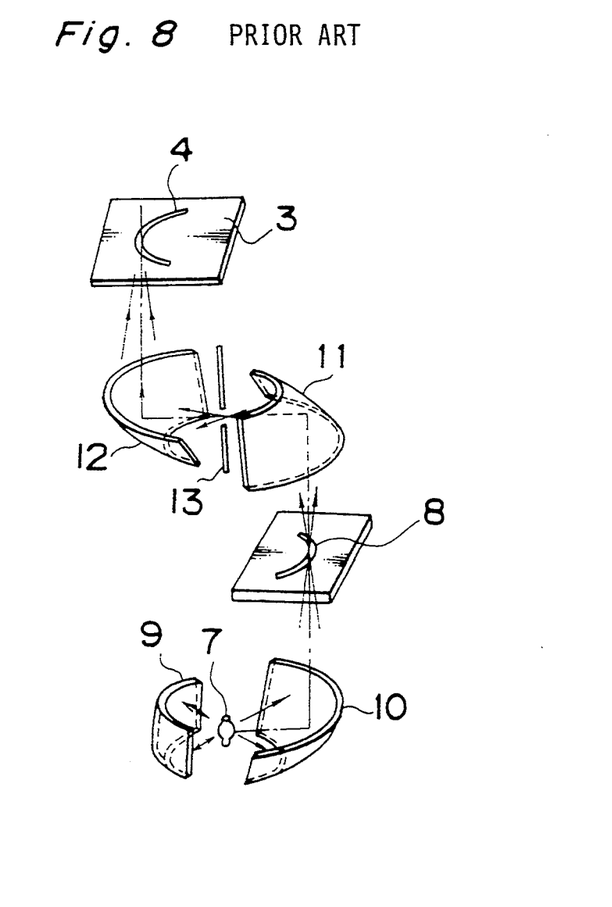
FIG. 8 is a view showing the construction of a conventional circular arc illumination apparatus.

FIG. 7 shows a construction of the projection optical system of a conventional 1:1 reflection type projection aligner comprising a concave mirror 1 and a convex mirror 2. A mask 3 is irradiated by circular arc slit illumination light 4 so as to project the pattern of the mask 3 on a substrate 5. The mask 3 and the substrate 5 are scanned in a direction shown by an arrow B and the direction opposite thereto. The circular arc slit illumination light is generated by enlarging the image of a circular arc lamp or making a point light source by using a reflecting mirror of the rotation symmetry type. The latter method is effective in using far ultraviolet rays. This kind of optical system is disclosed in Japanese Laid-Open Patent Publication Nos. 54-123877 and 57-200012. The apparatus disclosed in the former publication has a spherical mirror, and the apparatus disclosed in the latter publication has a four-dimensional curved surface mirror formed by rotating an ellipse mirror. FIG. 8 shows the construction of a circular arc illumination apparatus for obtaining circular arc illumination. The apparatus comprises reflecting mirrors 10, 11, and 12 serving as a spherical mirror and a four-dimensional curved surface mirror; a point light source 7; a slit 8; a spherical reflecting mirror 9; and a pin hole 13.

Figure 9:
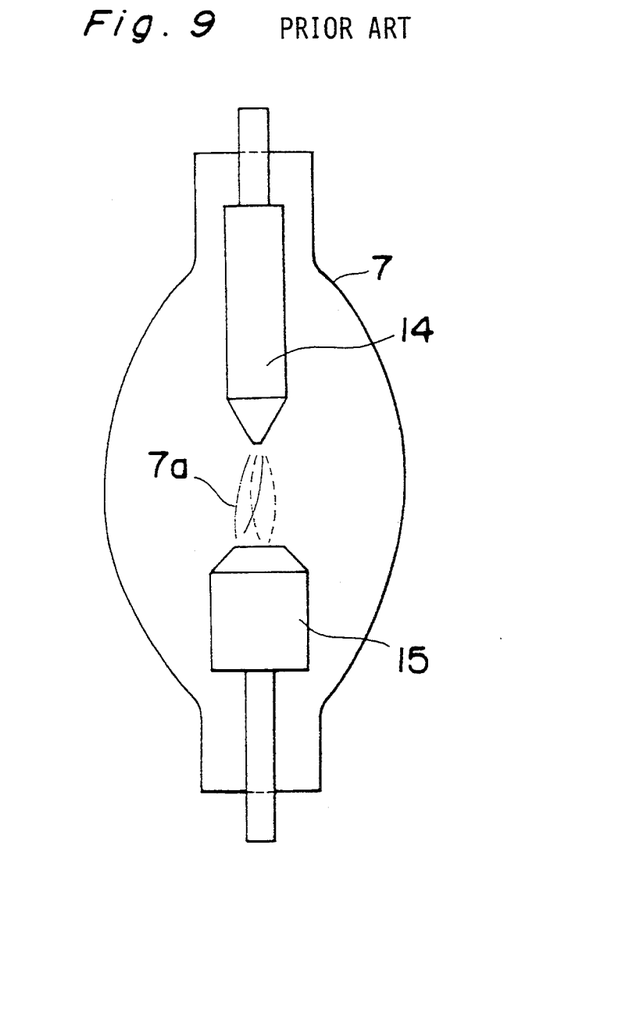
FIG. 9 is a view showing a discharge electrode of a point light source of a conventional circular arc illumination apparatus.

The conventional apparatuses having the abovedescribed constructions have, however, the following three disadvantages: The first disadvantage is illumination nonuniformity. FIG. 9 shows discharge electrodes 14 and 15 of the point light source 7. The emission of the point light source 7 is generated by an arc 7a disposed between the electrodes 14 and 15. The discharge position on the surface of the electrode 15 changes with the elapse of time. As a result, the position of the spot light source is nonuniform. Accordingly, the image of the point light source 7 formed via the reflecting mirror 10 shown in FIG. 8 is varied, which causes the generation of nonuniform illumination. The second disadvantage is inefficiency in the utilization of light because a luminous flux is shaped through the circular arc slit. The third disadvantage is cost and difficulty in manufacture. In the exposure of a large liquid crystal substrate, on which research and development has been made in recent years, there are demands for the provision of large optical instruments, such as a large reflecting mirror which produces a large quantity of circular arc illumination light. Therefore, the cost for manufacturing the apparatus is inevitably high, and further, it is difficult to manufacture it.

Figure 10:
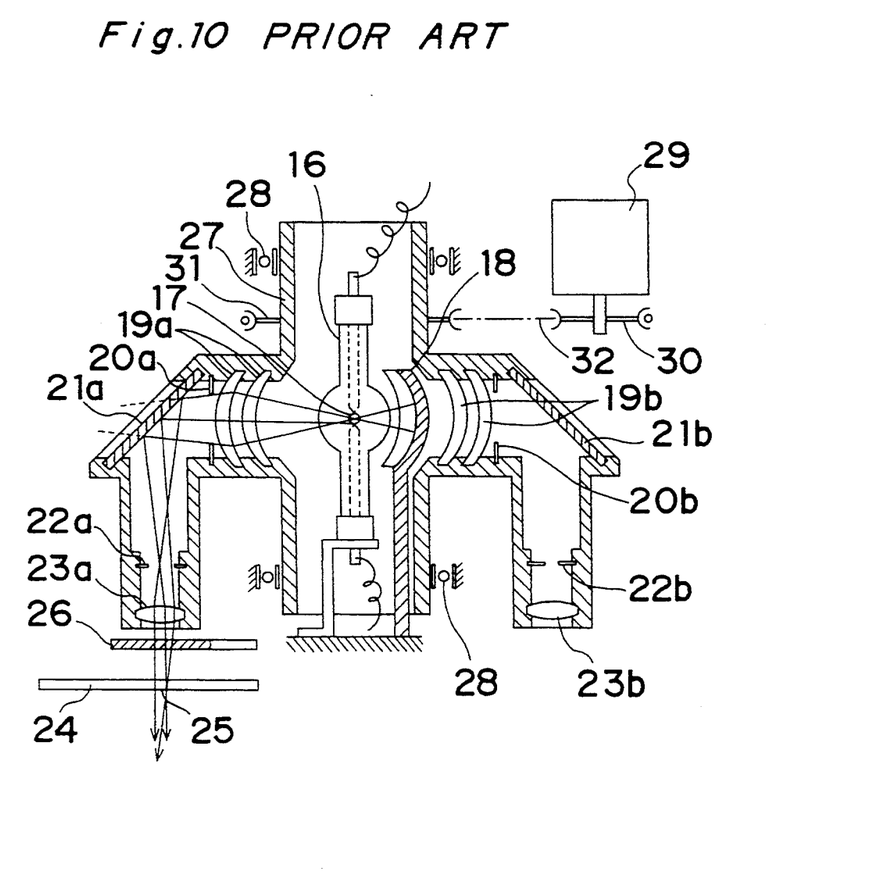
FIG. 10 is a sectional view showing a conventional circular arc illumination apparatus using a rotary illumination optical system.

In order to eliminate the above-described disadvantages, the present applicant has proposed a circular arc illumination apparatus comprising a rotary illumination optical system disclosed in Japanese Laid-Open Patent Publication No. 63-102228. FIG. 10 shows the construction of the circular arc illumination apparatus comprising a light source 16; an arc 17 disposed between the electrodes of the light source 16; a spherical reflecting mirror 18; auxiliary condenser lenses 19a and 19b; illumination field stops 20a and 20b; plane mirrors 21a and 21b of the heat ray transparent type; aperture-stops 22a and 22b; and condenser lenses 23a and 23b. The position relationship among the above-described optical instruments is as follows. The image of the arc 17 is formed at the aperture diaphragm 22a via the auxiliary condenser lens 19a. The front focal point of the condenser lens 23a is at the aperture diaphragm 22a. The image of the illumination field stops 20a is formed on the lower surface of the mask 24, thus constituting a Koehler illumination optical system. The optical instruments 19a through 23a are installed on a rotary frame 27, rotatably supported by bearings 28 and connected with a motor 29 via pulleys 30 and 31 and a belt 32. The light source 16 and the spherical reflecting mirror 18 are fixed and thus nonrotatable. In the construction described above, spot illumination having an optical axis parallel with the rotary shaft scans an object on the periphery of the rotary shaft, thus performing a circular arc illumination. Since a great number of large concave mirrors is not used, the apparatus can be manufactured easily and at a low cost.

Figure 11:
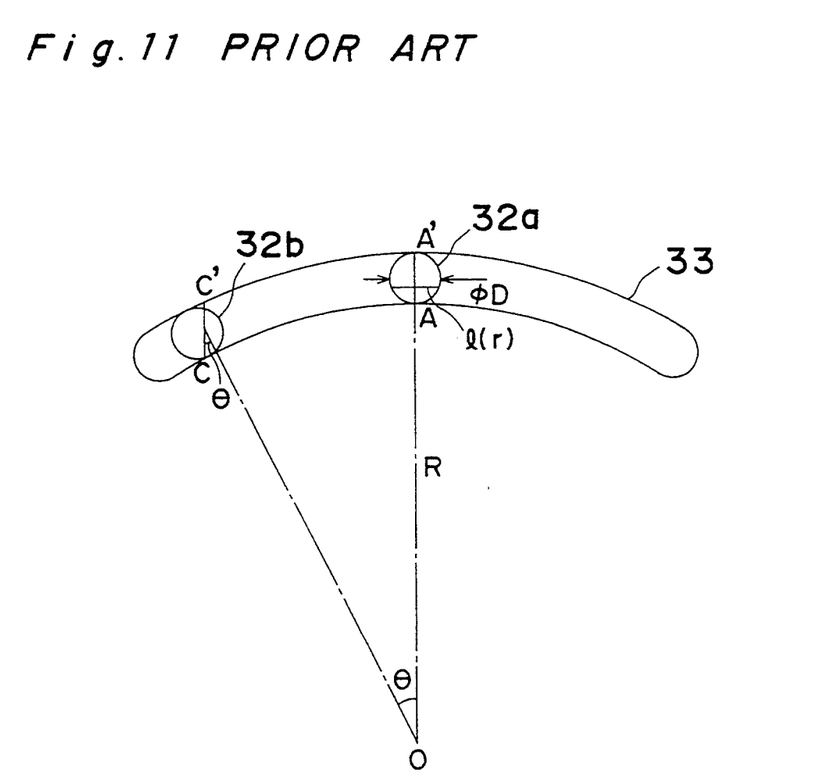
FIG. 11 is a view showing the locus of a spot light generated by the conventional circular arc illumination apparatus.

In the construction disclosed in Japanese Laid-Open Patent Publication No. 63-102228, the mask 24 is not uniformly exposed. FIG. 11 shows the locus of spot light. A circular arc region 33 of the mask 24 is illuminated by spot lights which overlap each other. Supposing that spot light having a diameter of (D) generates a circular arc, the radius of which is (R), a slight region (dxdy) on the mask 24 moves a distance of A–A' at the center of scanning, i.e. the center of the mask, while the slight region (dxdy) moves a distance C–C' at an end of scanning, i.e. an end of the mask 24. Therefore, the time period in which the slight region at the center of the mask 24 is irradiated by the spot lights is different from the time period in which the slight region at the end thereof is irradiated by the spot lights. Thus, there is a difference in the exposure time period between the two slight regions. In this manner, the mask is nonuniformly exposed.

SUMMARY OF THE INVENTION

It is an object of the present invention to provide a circular arc illumination apparatus which efficiently utilizes light emitted by a light source device.

It is another object of the present invention to provide a circular arc illumination apparatus which exposes an object uniformly.

It is still another object of the present invention to provide a circular arc illumination apparatus preferable for exposing a large substrate.

In accomplishing these and other objects, according to a first aspect of the present invention, there is provided a circular arc illumination apparatus comprising: a light source device; a condensing optical system for condensing rays emitted by the light source device; and a scanning optical system for transmitting the rays to an object to be scanned, the scanning optical system including a driving device, a rotating mirror driven by the driving device, an angular velocity detecting device for detecting an angular velocity of the rotating mirror, a controller for controlling the driving device based on an angular velocity of the rotating mirror detected by the angular velocity detecting device so as to vary the angular velocity in one time scanning, and a circular arc-shaped bending mirror for reflecting scanning rays reflected by the rotating mirror to the object, which axis of the bending mirror is coincident with a rotary axis of the rotating mirror.

By the above construction of the first aspect of the present invention, the angular velocity set for scanning the object at the center thereof may be differentiated from that at the end thereof by controlling the rotation of the rotating mirror. That is, the object may be scanned slowly at the center thereof and fast at the end thereof. That is, the exposure amount obtained by multiplying a time period for scanning each portion by the quantity of illumination light for exposing the portion may be set to be constant, with the total scanning time period set to be constant.

According to a second aspect of the present invention, there is provided a circular arc illumination apparatus comprising: a light source device; a condensing optical system for condensing rays emitted by the light source device; a scanning optical system for transmitting the rays to an object to be scanned, the scanning optical system including a driving device, a rotating mirror driven by the driving device, an angular velocity detecting device for detecting an angular velocity of the rotating mirror, a controller for controlling the driving device based on an angular velocity of the rotating mirror detected by the angular velocity detecting device so as to vary the angular velocity in one time scanning, and a circular arc-shaped bending mirror for reflecting scanning rays reflected by the rotating mirror to the object, which axis of the bending mirror is coincident with a rotary axis of the rotating mirror; and a variable diaphragm, an aperture of which is variable according to a scanning angle of the rotating mirror and which is provided at a position conjugate to a focal point of the condensing optical system.

By the above construction of the second aspect of the present invention, the diameter of spot light at the plane of the focal point of the condensing optical system is changed by the variable diaphragm. That is, the aperture of the variable diaphragm is varied according to the angular velocity of the rotating mirror, namely, for example, largest in the center of the object to be scanned and smallest on the end thereof. In this example, the exposure amount obtained by multiplying a time period for scanning each portion by the quantity of illumination light for exposing the portion may be set to be constant, with the total scanning time period set to be constant.

According to a third aspect of the present invention, there is provided a circular arc illumination apparatus comprising: a light source device; a condensing optical system for condensing rays emitted by the light source device; a scanning optical system for transmitting the rays to an object to be scanned, the scanning optical system including a driving device, a rotating mirror driven by the driving device, an angular velocity detecting device for detecting an angular velocity of the rotating mirror, a controller for controlling the driving device based on an angular velocity of the rotating mirror detected by the angular velocity detecting device, and a circular arc-shaped bending mirror for reflecting scanning rays reflected by the rotating mirror to the object, which axis of the bending mirror is coincident with a rotary axis of the rotating mirror; and a light quantity varying-device provided between the light source device and the scanning optical system for varying the quantity of light in one time scanning.

By the above construction of the third aspect of the present invention, the quantity of illumination light at the center of the object to be scanned may be differentiated from that at the end thereof with the diameter of the spot light maintained constant. That is, for example, the quantity of illumination light may be made to be large at the center of the object while the quantity of light may be made to be small at the end thereof. Then, in this example, the exposure amount obtained by multiplying a time period for scanning each portion by the quantity of illumination light for exposing the portion may be set to be constant.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
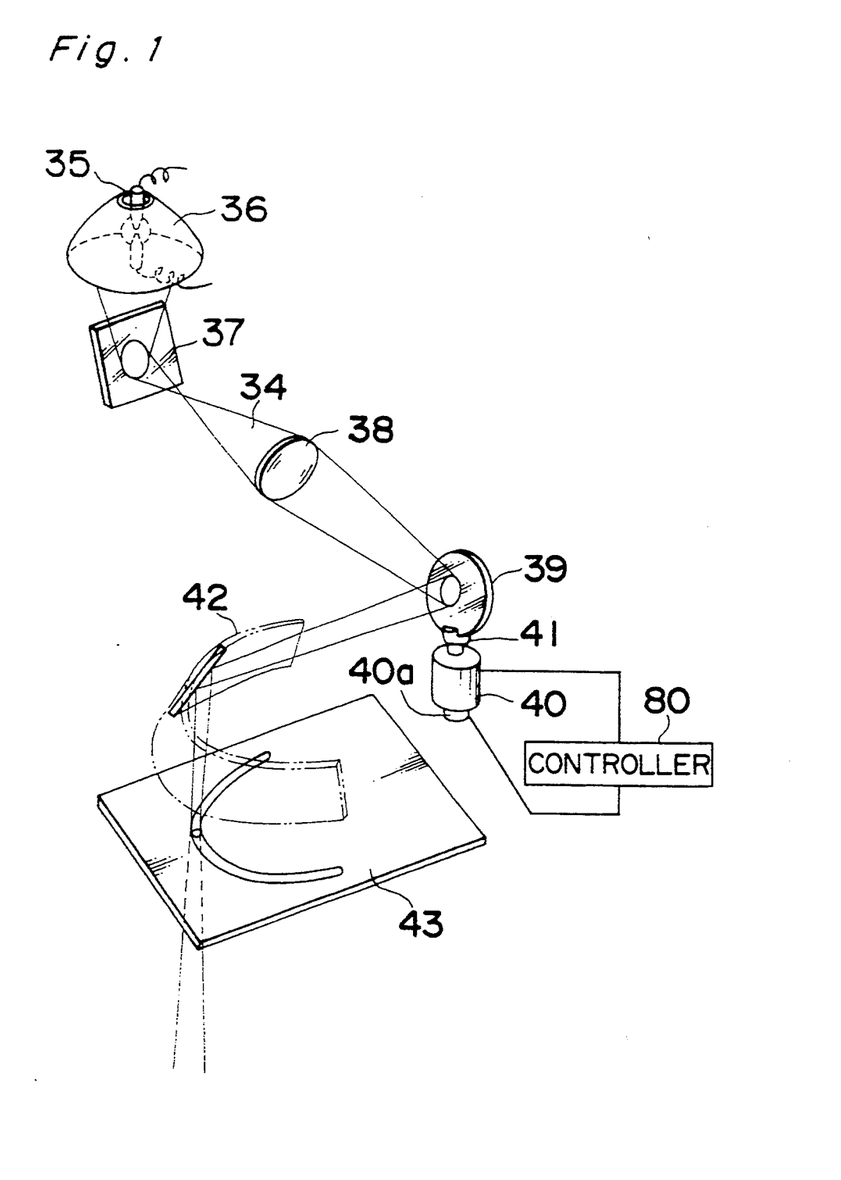
FIG. 1 is a perspective view showing a circular arc illumination apparatus according to a first embodiment of the present invention.
Figure 2A:
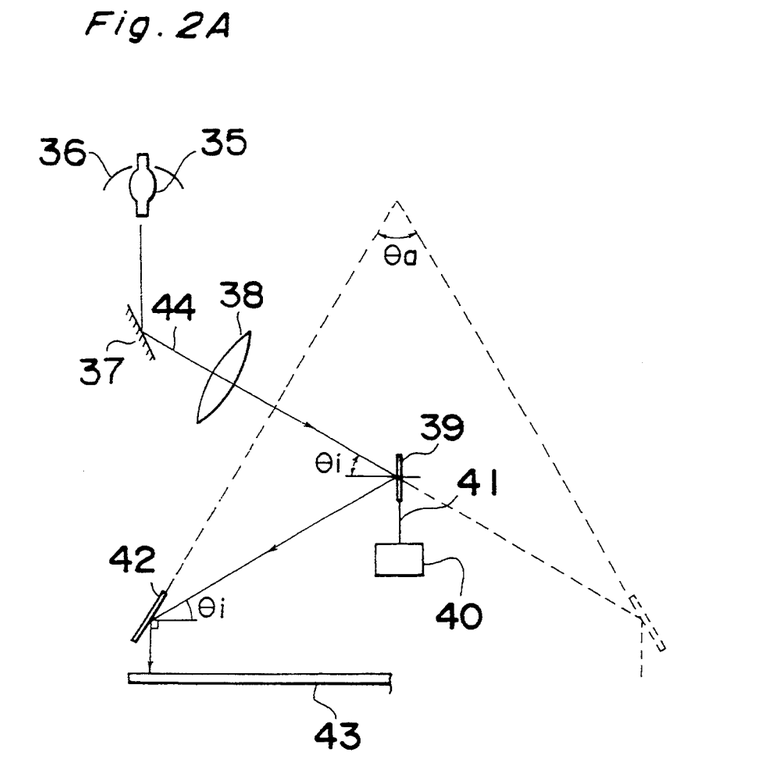
FIG. 2A is a sectional view showing the circular arc illumination apparatus according to the first embodiment.

Referring now to FIGS. 1 and 2A, a circular arc illumination apparatus according to a first embodiment of the present invention is described below. FIG. 1 is a schematical perspective view showing the circular arc illumination apparatus. The apparatus comprises an elliptic mirror 36 and a plane mirror 37, a condensing optical system 38, a rotating mirror 39, a motor 40 having a rotary encoder 40a to monitor its rotational speed and the rotational angle, a controller 80 for controlling the motor 40 based on signals from the rotary encoder 40a, a mirror holder 41, and a bending mirror 42. The elliptic mirror 36 and the plane mirror 37 reflect a ray 34 emitted by a light source 35 consisting of an extra-high pressure mercury lamp, an ultraviolet laser or the like. The condensing optical system 38 is shown in FIG. 1 as a refracting optical system. But the condensing optical system 38 may consist of a reflecting optical system. The rotating mirror 39 is formed by evaporating aluminum, having a high reflectivity even in the ultraviolet region, over both surfaces of a thin glass plate, and is provided along the optical path. The motor 40 is equipped with a rotary encoder for monitoring the rotational speed of the motor 40 and the rotational angle thereof. The mirror holder 41 connects the rotating mirror 39 and the motor 40 with each other so that the rotating mirror 39 is rotated by the motor 40. The bending mirror 42 forms a part of a conical surface, the axis of which is the shaft of the motor 40. A mask 43 to be exposed is disposed below the bending mirror 42. Then, a ray travels to the mask 43 so as to scan the mask 43 according to the rotation of the rotating mirror 39.

The bending mirror 42 is described below in detail with reference to FIG. 2A which shows a sectional view of the circular arc illumination apparatus. Reference numeral 44 denotes a principal ray emitted by the light source 35. In this construction, rays of light emitted by the light source 35 and reflected by the elliptic mirror 36 are reflected by the mirror 37 and condensed by the condensing lens 38 to form condensed rays, and then the condensed rays are reflected by the rotating mirror 39 and the bending mirror 42, thus traveling to the mask 43 so as to scan the mask 43 according to the rotation of the rotating mirror 39. The rays on the mask 43 form an arc as the scanned locus, the center of which is right beneath the shaft of the motor 40. Supposing that the principal ray 44 is incident on the rotating mirror 39 at an angle of $\theta_i$, the vertical angle $\theta_a$ of the cone formed by the bending mirror 42 is $90° - \theta_i$. When the cone of the entire conical surface is formed owing to the rays caused by the rotation of the rotating mirror 39, only a portion irradiated by the rays is partially used from the entire conical surface of the bending mirror 42. In this manner, with the axis of the bending mirror 42 coincident with that of the cone, the rays are capable of being incident on the mask 43 at a right angle therewith and forms thereon a circular arc, the axis of which is the shaft of the motor 40.

Figure 2B:
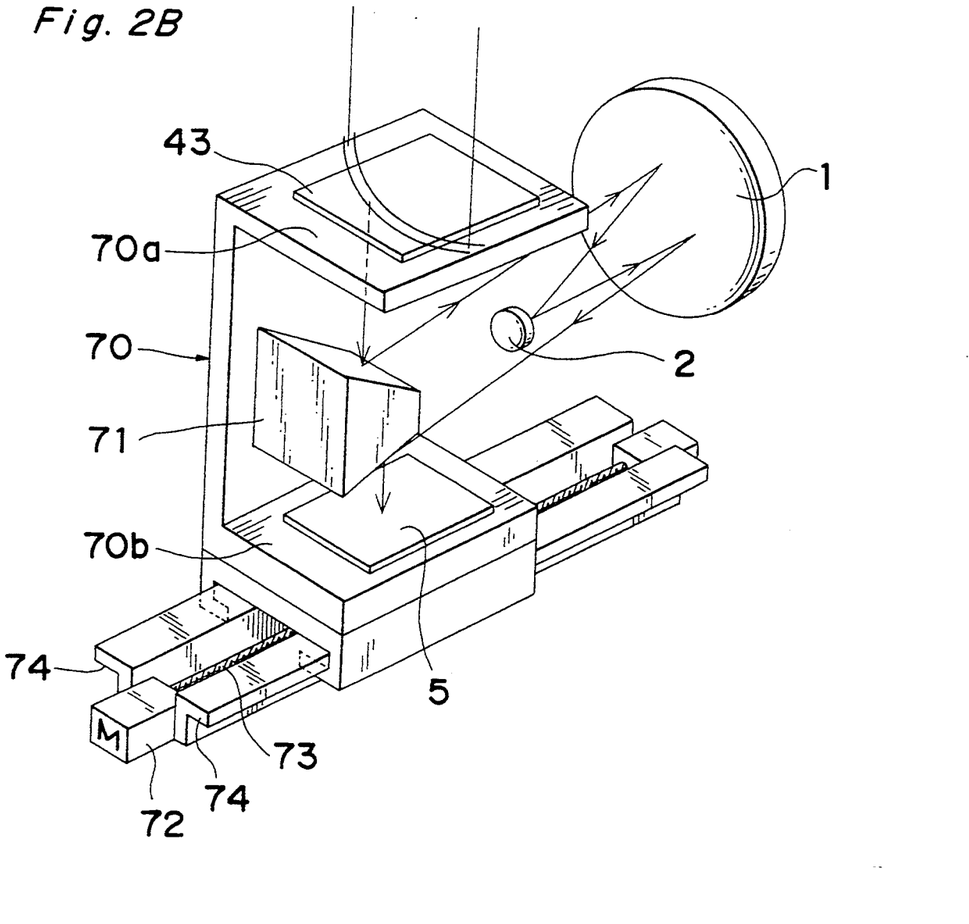
FIG. 2B is a perspective view showing a mask driving mechanism.
Figure 2C:
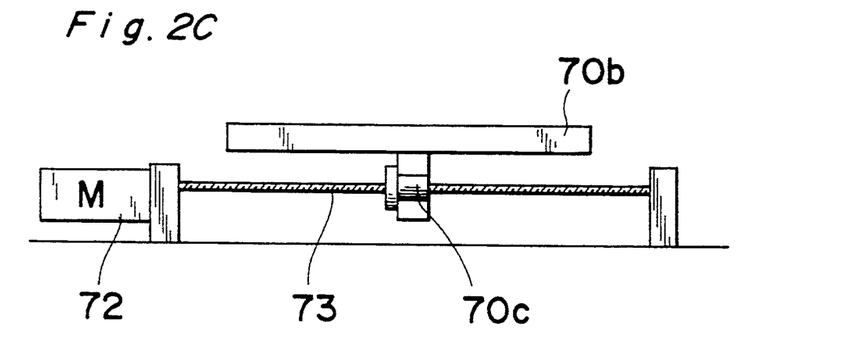
FIG. 2C is a side view of the mechanism in FIG. 2B.

The mask 43 can move by a mask driving mechanism shown in FIGS. 2B and 2C. In FIGS. 2B and 2C, a mask supporting member 70 has an upper surface 70a for placing the mask 43 thereon and a lower surface 70b for placing a substrate 5 thereon. A trapezoidal mirror 71, the concave mirror 1, and the convex mirror 2 are fixed to the mask supporting member 70 so that the illumination light passing through the mask 43 and the upper surface 70a of the mask supporting member 70 can be reflected on the upper inclined surface of the trapezoidal mirror 71, the concave mirror 1, the convex mirror 2, the concave mirror 1, and the lower inclined surface of the trapezoidal mirror 71, thus being incident on substrate 5. The lower projection 70c projected from the bottom surface of the mask supporting member 70 is connected with a screw rod 73. The screw rod 73 is reversibly rotated by a motor 72 to backwardly and forwardly move the mask supporting member 70 while the mask supporting member 70 is guided by a pair of guide rails 74, so that the circular arc illumination region is moved from one end to the other end of the mask 43 by moving the mask 43.

The method for exposing the entire surface of the mask 43 uniformly is described below. Referring to FIG. 11, supposing that a slight region (dxdy) moves a distance of A-A' on the mask 43, the time period (T) in which the spot light and the slight region (dxdy) overlap each other is expressed as follows:

$$T = \int (l(r)/r\omega) dr$$

where ($\omega$) is the scanning angular velocity of the motor 40 detected by the rotary encoder 40a; r is the distance between the rotary center (O) of the motor 40 and the slight region (dxdy); and (l(r)) is the length obtained by the overlap of the spot light over the slight region (dxdy).

Integration is performed during the time period in which the slight region (dxdy) and the spot light overlap each other. When the slight region (dxdy) moves a distance (r) along a line segment C-C', the slight region (dxdy) moves (rcos $\theta$) in the radial direction of the circular arc. Supposing that $\beta = r\cos\theta$, $$dr = d\beta/\cos\theta + \beta \sin\theta/\cos^2\theta$$

When the radius (R) of the circular arc is long and the change of ($\theta$) is slight, (d$\theta$) is regarded as zero. Thus, (dr) is approximated as follows:

$$dr = d\beta/\cos\theta$$

At this time, the time period (T') in which the spot light and the slight region (dxdy) overlap each other is expressed as follows:

$$T' = \int (l(r)/r\omega) d\beta/\cos\theta$$

Rewriting ($\beta$) by (r), T' is expressed as follows:

$$T' = 1/\cos\theta \cdot \int (l(r)/r\omega) dr = 1/\cos\theta \cdot T$$

Figure 2D:
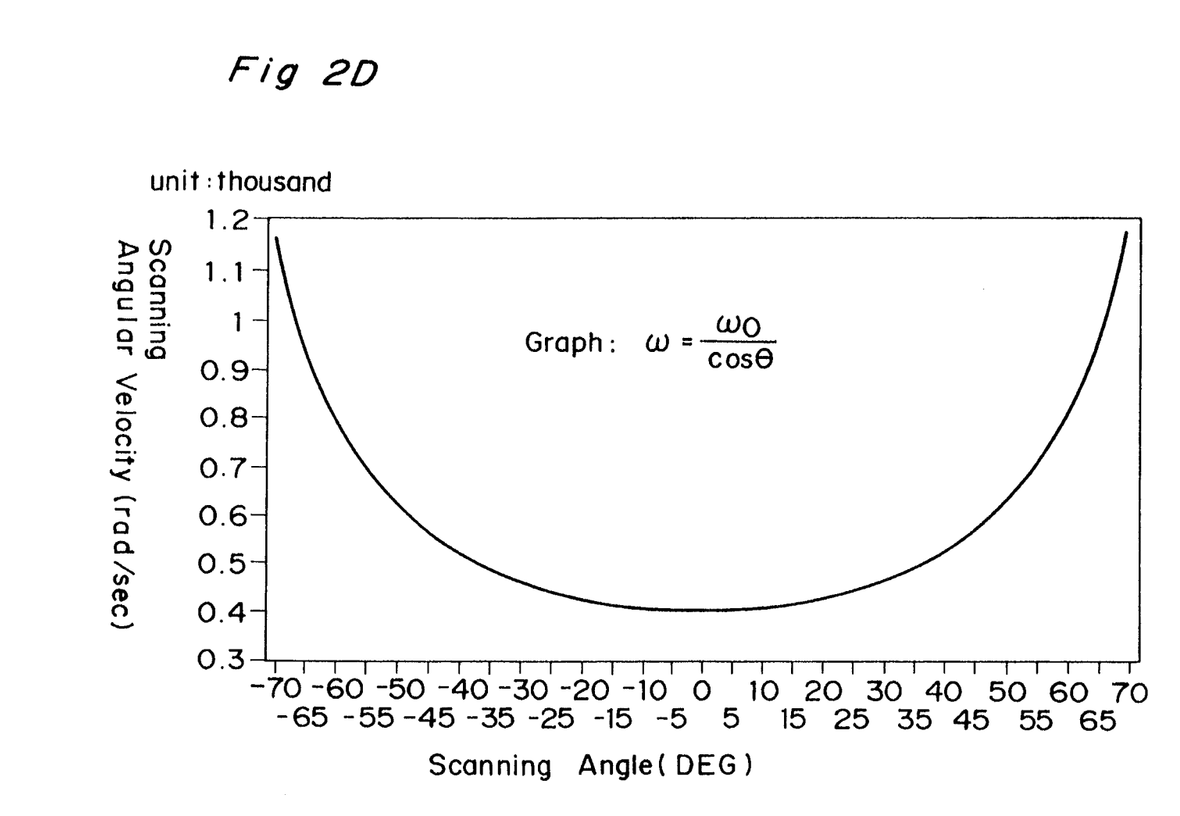
FIG. 2D is a graph of ($\omega=\omega/\cos\theta$) showing an example of the relationship between the scanning angular velocity $\omega$ and the scanning angle $\theta$.
Figure 2E:
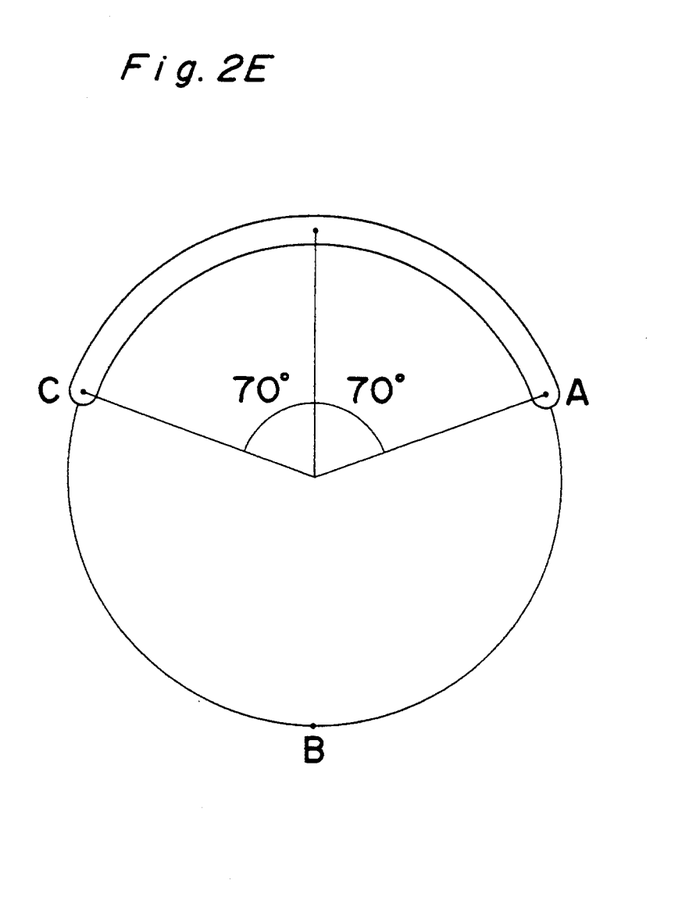
FIG. 2E is a view showing an example of scanning angle.

Accordingly, assuming that the angular velocity of the motor 40 in scanning is expressed as $\omega/\cos\theta$ when the scanning angle is ($\theta$), T = T'. Accordingly, the entire mask 43 can be uniformly exposed. Electric current in the motor 40 is changed according to the rotational angle thereof to adjust the angular velocity thereof to $\omega/2\cos\theta$. In this manner, the rays expose the mask 43 uniformly in the configuration of a circular arc. FIG. 2D is a graph of ($\omega = \omega_O/\cos\theta$) showing an example of the relationship between the scanning angular velocity $\omega$ and the scanning angle $\theta$. For example, if the rotational number of the motor is 7500 rpm, the minimum angular velocity is 399 rad/sec when the scanning angle is zero, and the maximum angular velocity is 1167 rad/sec when the scanning angle is 70°. FIG. 2E shows an example of scanning angle. In FIG. 2E, the scanning angle for a circular arc illumination is ±70°, and the scanning angular velocity is changed according to the graph shown in FIG. 2D. Then, since the time period when the rotating mirror rotates from the point (A) through the point (B) to the point (C) in FIG. 2E is wasted, the rotating mirror rotates at the maximum angular velocity of 1167 rad/sec in the region between the points (A), (B), and (C). The moving velocity of the mask is 20 mm/sec, which causes a substrate of 400 mm thickness to be exposed for 20 sec. Moreover, in this embodiment, the rear surface of the rotating mirror 39 also serves as a mirror surface. Therefore, the mask 43 can be scanned twice per rotation of the rotating mirror 39. Thus, the load applied to the motor 40 may be reduced.

As described above, the angular velocity of the rotating mirror 39 is changed according to the rotational angle thereof. The light transmission efficiency of the apparatus according to the first embodiment is 34%, which is approximately 26 times as high as that (approximately 1.3%) of a conventional apparatus adopting a reflecting mirror of rotation symmetry. Accordingly, the circular arc illumination apparatus according to the first embodiment exposes the mask 34 uniformly and further is compact.

Figure 3:
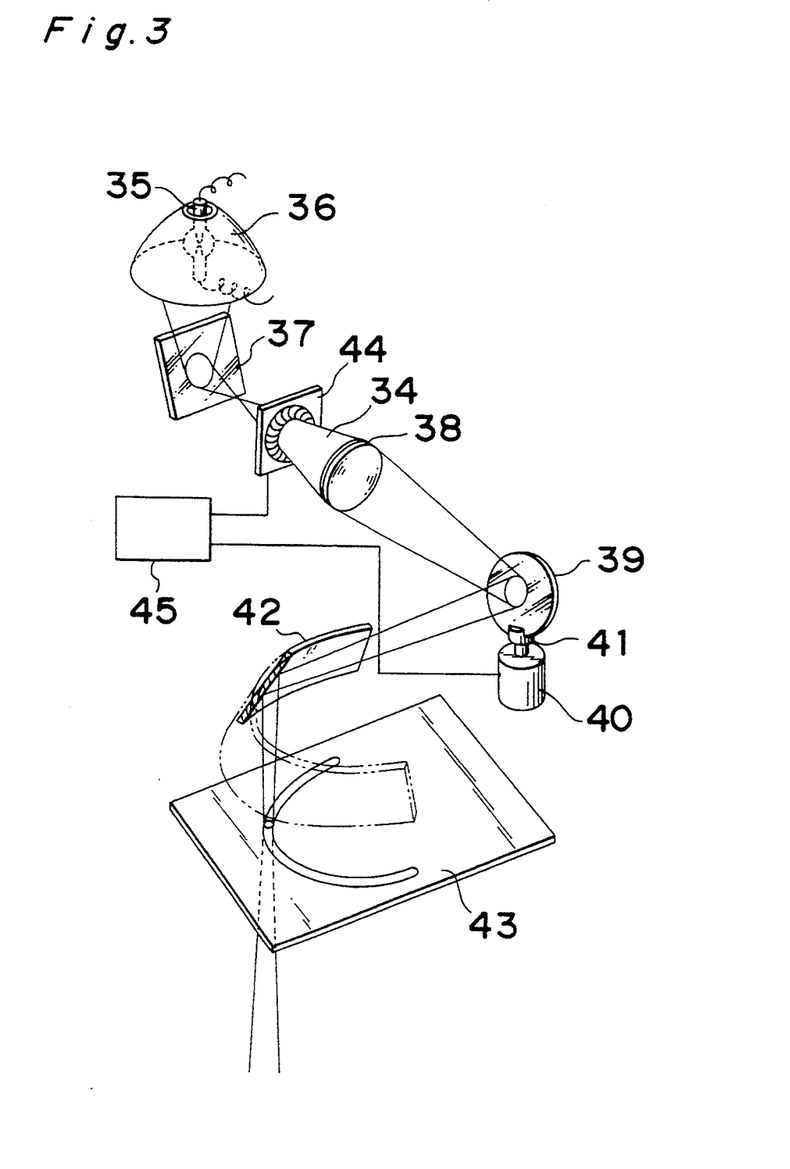
FIG. 3 is a perspective view showing a circular arc illumination apparatus according to a second embodiment of the present invention.
Figure 4:
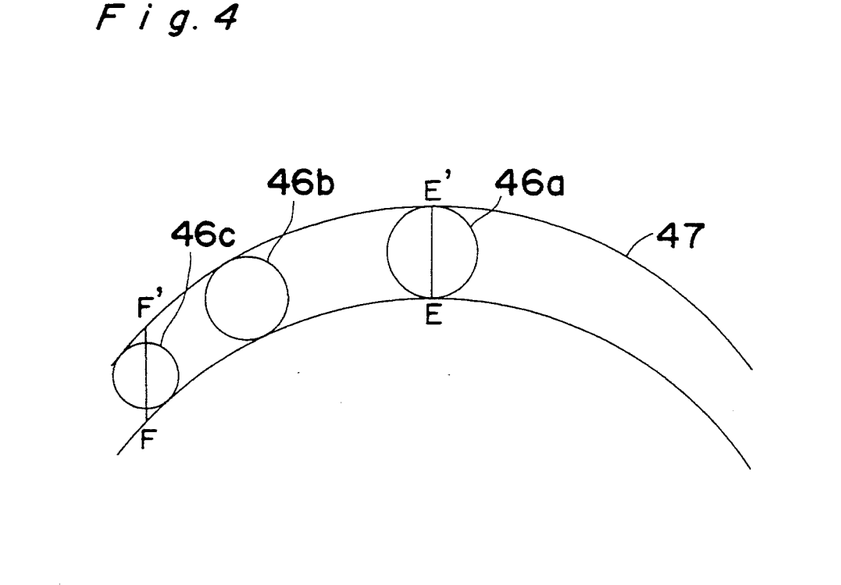
FIG. 4 is a view showing the locus of spot light generated by the circular arc illumination apparatus according to the second embodiment.

The circular arc illumination apparatus according to the second embodiment of the present invention is described below with reference to FIGS. 3 and 4. The construction of the apparatus according to the second embodiment is the same as that of the apparatus according to the first embodiment except that a variable diaphragm 44 and a control device 45 for controlling the aperture quantity of the variable diaphragm 44 are provided between the light source 35 and the condensing optical system 38. The variable diaphragm 44 is disposed so that it is conjugate to the condensing optical system 38 with respect to the mask 43.

The operation of the circular arc illumination apparatus having the above construction is described below with reference to FIGS. 3 and 4. Similarly to the first embodiment, the mask 43 is scanned in the configuration of a circular arc by rays converged by the condensing optical system 38 and reflected by the rotating mirror 39. The control device 45 reads a signal, indicating the rotational angle of the motor 40, transmitted from the rotary encoder 40a installed on the motor 40, thus controlling the aperture quantity of the variable diaphragm 44 according to the rotational angle thereof. In this manner, any portion of the mask 43 can be exposed in a uniform quantity. The reason is described below with reference to FIG. 4. A circular arc region 47 of the mask 43 is illuminated by spot lights 46a, 46b, and 46c which overlap each other. The slight region (dxdy) of the mask 43 moves a distance of E–E' in the center of scanning, while the slight region (dxdy) moves a distance F–F' at the end of scanning. As shown in FIG. 4, the aperture of the variable diaphragm 44 is varied according to the scanning angular velocity of the rotating mirror 39, namely, largest in the center of scanning and smallest at the end of scanning. The diameter of the spot light on the mask 43 conjugate to the variable diaphragm 44 with respect to the condensing optical system 38 is varied with the change of the aperture of the variable diaphragm 44. In this manner, the lengths of the line segments EE' and FF' can be adjusted. That is, the mask 43 can be exposed in a uniform quantity with the angular velocity of the rotating mirror 39 set to be constant and also the total time period for scanning the entire mask 43 set to be constant. That is, the apparatus according to the second embodiment provides a circular arc illumination which exposes the mask 43 in a uniform quantity and is compact.

Figure 5:
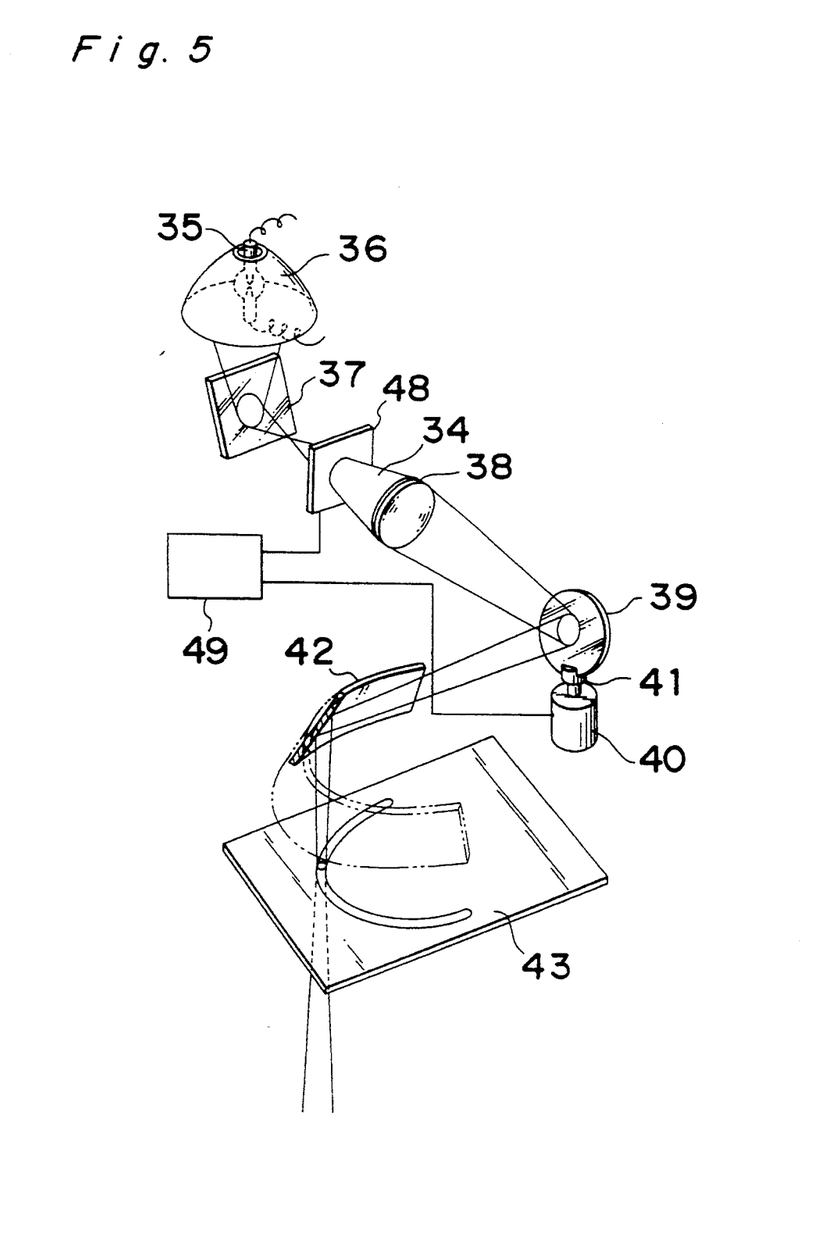
FIG. 5 is a perspective view showing a circular arc illumination apparatus according to a third embodiment of the present invention.
Figure 6:
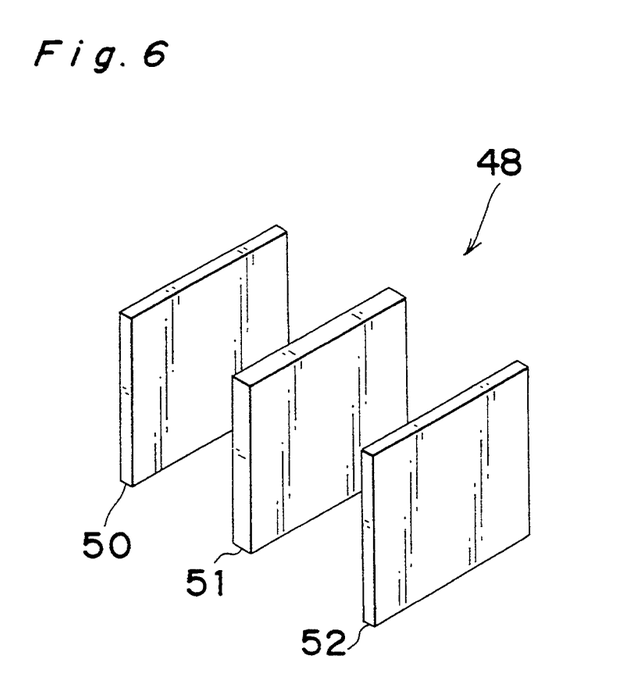
FIG. 6 is a perspective view showing an example of a light quantity varying filter.

The circular arc illumination apparatus according to the third embodiment of the present invention is described below with reference to FIGS. 5 and 6. The construction of the apparatus according to the third embodiment is the same as that of the apparatus according to the first embodiment, except that a light quantity-varying filter 48 and a control device 49 for controlling the quantity of light passing through the light quantity-varying filter 48 are provided between the light source 35 and the condensing optical system 38. FIG. 6 shows an example of the light quantity-varying filter 48 comprising a polarizer 50, a liquid crystal panel 51 provided with an electrode on each surface thereof, and an analyzer 52, the polarization axis of which is perpendicular to the polarizer 50. A ray which has passed through the polarizer 50 becomes linearly polarized. When the linearly polarized ray passes through the liquid crystal panel 51, the polarization axis of the ray is rotated according to a voltage applied to the liquid crystal panel 51. The transmission quantity of light passing through the light quantity-varying filter 48 is determined according to an angle formed between the polarization axis of the ray 50 and that of the analyzer 52. Accordingly, it is possible to control the transmission quantity of light by controlling the voltage to be applied to the liquid crystal panel 51.

The operation of the circular arc illumination apparatus having the above construction is described below with reference to FIG. 5 and 6. Similarly to the first embodiment, the mask 43 is scanned in the configuration of a circular arc by rays converged by the condensing optical system 38 and reflected by the rotating mirror 39. The control device 49 reads a signal, indicating the rotational angle of the motor 40, transmitted from the rotary encoder 40a installed on the motor 40, thus controlling the transmission quantity of light which passes through the light quantity-varying filter 48 according to the rotational angle of the motor 40. That is, the transmission quantity of light is made to be large at the center of scanning where the total scanning time period is short, while the transmission quantity of light is made to be small at the end of scanning where the total scanning time period is long. In this manner, the exposure quantity obtained by multiplying the total scanning time period for exposing a portion by the quantity of illumination light is set to be constant, with the entire mask 43 exposed in a uniform quantity. As described above, the apparatus according to the third embodiment provides a circular arc illumination which exposes the mask 43 in a uniform quantity, with the angular velocity of the rotating mirror 39 and the diameter of the spot light maintained constant, and a constant resolution, proportional to the diameter of spot light, maintained in scanning the entire object, and in addition the apparatus is compact.

In the first embodiment, instead of the rotating mirror on which the rear surface also serves as a mirror, a polygon mirror for use in a laser scanner may provide an effect similar to that obtained by the rotating mirror. In the third embodiment, instead of the light quantity-varying filter comprising the liquid crystal panel, any other mechanical light quantity-varying diaphragm, such as a variable diaphragm used in automatic focusing, can provide an effect similar to that obtained by the light quantity-varying filter.

Although the present invention has been fully described in connection with the preferred embodiments thereof and with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A circular arc illumination apparatus comprising:
   a light source device;
   a condensing optical system for condensing rays emitted by the light source device; and
   a scanning optical system for transmitting the rays to an object to be scanned, the scanning optical system including a driving device, a rotating mirror driven by the driving device, an angular velocity detecting device for detecting an angular velocity of the rotating mirror, a controller for controlling the driving device based on an angular velocity of the rotating mirror detected by the angular velocity detecting device so as to vary the angular velocity in one time scanning, and a circular arc-shaped bending mirror for reflecting scanning rays reflected by the rotating mirror to the object, the bending mirror having an axis coincident with a rotary axis of the rotating mirror.

2. The circular arc illumination apparatus as claimed in claim 1, wherein the light source device includes a light source and an elliptic mirror for reflecting the rays emitted by the light source.

3. A circular arc illumination apparatus comprising:
   a light source device;
   a condensing optical system for condensing rays emitted by the light source device;
   a scanning optical system for transmitting the rays to an object to be scanned, the scanning optical system including a driving device, a rotating mirror driven by the driving device, an angular velocity detecting device for detecting an angular velocity of the rotating mirror, a controller for controlling the driving device based on an angular velocity of the rotating mirror detected by the angular velocity detecting device so as to vary the angular velocity in one time scanning, and a circular arc-shaped bending mirror for reflecting scanning rays reflected by the rotating mirror to the object, the bending mirror having an axis coincident with a rotary axis of the rotating mirror; and
   a variable diaphragm having aperture that is variable according to a scanning angle of the rotating mirror and which is provided at a position conjugate to a focal point of the condensing optical system.

4. The circular arc illumination apparatus as claimed in claim 3, wherein the light source device includes a light source and an elliptic mirror for reflecting the rays emitted by the light source.

5. A circular arc illumination apparatus comprising:
   a light source device;
   a condensing optical system for condensing rays emitted by the light source device;
   a scanning optical system for transmitting the rays to an object to be scanned, the scanning optical system including a driving device, a rotating mirror driven by the driving device, an angular velocity detecting device for detecting an angular velocity of the rotating mirror, a controller for controlling the driving device based on an angular velocity of the rotating mirror detected by the angular velocity detecting device, and a circular arc-shaped bending mirror for reflecting scanning rays reflected by the rotating mirror to the object, the bending mirror having an axis coincident with a rotary axis of the rotating mirror; and
   a light quantity varying-device provided between the light source device and the scanning optical system for varying the quantity of light in one time scanning.

6. The circular arc illumination apparatus as claimed in claim 5, wherein the light source device includes a light source and an elliptic mirror for reflecting the rays emitted by the light source.

7. The circular arc illumination apparatus as claimed in claim 5, wherein the light quantity varying-device is a filter the transmittance of which is variable so as to vary the quantity of light in one time scanning.

8. The circular arc illumination apparatus as claimed in claim 7, wherein the filter includes a polarizer for linearly polarizing rays which pass through the polarizer, a liquid crystal panel provided with an electrode on each surface thereof for rotating a polarization axis of each of the rays according to a voltage applied to the liquid crystal panel when the linearly polarized rays pass through the liquid crystal panel, and an analyzer having a polarization axis perpendicular to that of the polarizer, for controlling the transmission quantity of light passing through the analyzer according to an angle formed between the polarization axis of each of the rays and that of the analyzer.

* * * * *